United States Patent
Tamrakar et al.

(10) Patent No.: US 10,374,799 B2
(45) Date of Patent: Aug. 6, 2019

(54) METHOD AND APPARATUS FOR IDENTITY BASED TICKETING

(75) Inventors: Sandeep Tamrakar, Espoo (FI); Jan-Erik Ekberg, Vantaa (FI); Jukka Virtanen, Helsinki (FI); Nadarajah Asokan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 269 days.

(21) Appl. No.: 14/111,007

(22) PCT Filed: Apr. 13, 2011

(86) PCT No.: PCT/FI2011/050324
§ 371 (c)(1),
(2), (4) Date: Jan. 14, 2014

(87) PCT Pub. No.: WO2012/140308
PCT Pub. Date: Oct. 18, 2012

(65) Prior Publication Data
US 2014/0298016 A1  Oct. 2, 2014

(51) Int. Cl.
*G06Q 20/38* (2012.01)
*H04L 9/14* (2006.01)
(Continued)

(52) U.S. Cl.
CPC .............. *H04L 9/14* (2013.01); *G06F 21/335* (2013.01); *G06Q 20/0457* (2013.01);
(Continued)

(58) Field of Classification Search
CPC .......... H04L 9/14; H04L 9/30; G06F 21/335; G06Q 20/0457; G06Q 20/3278; G06Q 20/38215; G06Q 20/40975; G07B 15/02
(Continued)

(56) References Cited

U.S. PATENT DOCUMENTS 5,734,722 A * 3/1998 Halpern ............... G06K 7/0008
235/380
6,985,583 B1 * 1/2006 Brainard ................ G06F 21/31
380/277
(Continued)

FOREIGN PATENT DOCUMENTS

| CN | 1977514 A | 6/2007 |
|---|---|---|
| CN | 101816149 A | 8/2010 |
| WO | 2006012538 | 2/2006 |

OTHER PUBLICATIONS

D. Hoover and B. Kausik, "Software smart cards via cryptographic camouflage," in Proc. IEEE Symp. on Security and Privacy, 1999, pp. 208-215.*

(Continued)

*Primary Examiner* — Matthew T Henning
(74) *Attorney, Agent, or Firm* — Alston & Bird LLP (57) ABSTRACT

A method, apparatus, system and computer program where an apparatus stores user specific credentials, receives a certificate via the communication interface from a certificate authority and stores the certificate in the memory. The apparatus further stores a private key and a public key in the memory and attempts authenticating of the apparatus to a ticket reader for accessing a service, by transmission of one or more messages, wherein the messages contain an authenticator that has at least one of the following: the certificate or its cryptographic derivative; one or more data items contained by the certificate or a cryptographic derivative thereof. The messages are prepared such that the public key is not recoverable from outside of the authenticator.

13 Claims, 5 Drawing Sheets

(51) Int. Cl.
  *G06F 21/33* (2013.01)
  *G06Q 20/04* (2012.01)
  *G06Q 20/32* (2012.01)
  *G06Q 20/40* (2012.01)
  *G07B 15/02* (2011.01)
  *H04L 9/30* (2006.01)

(52) U.S. Cl.
  CPC ... *G06Q 20/3278* (2013.01); *G06Q 20/38215* (2013.01); *G06Q 20/40975* (2013.01); *G07B 15/02* (2013.01); *H04L 9/30* (2013.01); *H04L 2209/24* (2013.01)

(58) Field of Classification Search
  USPC .......................................................... 713/168
  See application file for complete search history.

(56) References Cited

U.S. PATENT DOCUMENTS

| | | | | |
|---|---|---|---|---|
| 8,380,992 | B2* | 2/2013 | Park | H04L 63/061 713/169 |
| 8,468,355 | B2* | 6/2013 | Gerdes, Jr. | H04L 9/3213 713/170 |
| 2001/0049787 | A1* | 12/2001 | Morikawa | H04L 9/3213 713/156 |
| 2002/0067832 | A1* | 6/2002 | Jablon | H04L 9/0844 380/277 |
| 2003/0005317 | A1* | 1/2003 | Audebert | G06Q 20/341 713/193 |
| 2003/0093666 | A1* | 5/2003 | Millen | G06F 21/335 713/157 |
| 2004/0019788 | A1* | 1/2004 | Miyazaki | H04L 9/3236 713/169 |
| 2004/0028221 | A1* | 2/2004 | Seysen | G06F 7/723 380/28 |
| 2004/0148374 | A1* | 7/2004 | Bush | H04L 63/0876 709/223 |
| 2005/0033962 | A1* | 2/2005 | Libin | G07C 9/00103 713/170 |
| 2005/0076216 | A1* | 4/2005 | Nyberg | H04L 9/0844 713/171 |
| 2005/0156026 | A1 | 7/2005 | Ghosh et al. | |
| 2005/0166263 | A1* | 7/2005 | Nanopoulos | G06F 21/31 726/7 |
| 2006/0059333 | A1* | 3/2006 | Gentry | H04L 9/3236 713/156 |
| 2006/0080732 | A1* | 4/2006 | Ohkubo | G06F 21/606 726/9 |
| 2007/0033642 | A1* | 2/2007 | Ganesan | H04L 63/0428 726/10 |
| 2008/0155257 | A1 | 6/2008 | Werner et al. | |
| 2008/0163247 | A1* | 7/2008 | Musial | G06F 21/77 719/313 |
| 2008/0301461 | A1* | 12/2008 | Coulier | G06F 21/31 713/184 |
| 2009/0198619 | A1* | 8/2009 | Tripunitara | G06Q 20/02 705/71 |
| 2009/0249074 | A1 | 10/2009 | Madhavan et al. | |
| 2009/0320118 | A1* | 12/2009 | Muler | G06F 21/34 726/9 |
| 2010/0238811 | A1* | 9/2010 | Rune | H04L 12/66 370/248 |
| 2010/0329458 | A1* | 12/2010 | Sinha | G06F 8/65 380/255 |
| 2011/0083015 | A1* | 4/2011 | Meier | H04L 9/3236 713/176 |
| 2011/0167270 | A1* | 7/2011 | Lee | H04L 9/0869 713/170 |
| 2012/0158903 | A1* | 6/2012 | Falk | H04W 12/10 709/217 |

OTHER PUBLICATIONS

Leslie Lamport. 1981. Password authentication with insecure communication. Commun. ACM 24, 11 (Nov. 1981), 770-772.*
Dominikus et al., "mCoupons: An Application For Near Field Communication (NFC)", 21st International Conference on Advanced Information Networking and Applications Workshops, vol. 2, May 21-23, 2007, 8 pages.
Extended European Search Report received for corresponding European Patent Application No. 11863689.3, dated Sep. 15, 2014, 7 pages.
Ruiter et al., "Formal Analysis Of The EMV Protocol Suite", Proceedings of the international conference on Theory of Security and Applications, 2011, pp. 113-129.
International Search Report received for corresponding Patent Cooperation Treaty Application No. PCT/FI2011/050324, dated Jan. 16, 2012, 5 pages.
Office action received for corresponding Chinese Patent Application No. 201180071561.5, dated Mar. 10, 2015, 12 pages of office action and no English translation available.
Written Opinion for International Application No. PCT/FI2011/050324 dated Jan. 24, 2012.
PKCS #1: RSA Encryption Standard, an RSA Laboratories Technical Note, Version 1.5 (dated Nov. 1, 1993) 17 pages.
Office Action for Chinese Application No. 201180071561.5 dated Feb. 25, 2016.
Office Action from corresponding Chinese Application No. 201180071561.5 dated Jun. 15, 2016.

* cited by examiner

METHOD AND APPARATUS FOR IDENTITY BASED TICKETING

TECHNICAL FIELD

The present application generally relates to identity based ticketing.

BACKGROUND

Access to some transport systems is controlled using near-field communication (NFC) based chip cards used by passengers and reader devices that are mounted at entrances and/or exits. Some metro systems have automatic gates that open when a chip card is validated. In identity based systems, user identities are stored and associated with respective user accounts and electric tickets. The use of public transport is charged from the respective user account when use of the electric tickets at the gates is observed.

In identity based systems, the user identities are not used as such as a ticket so as to mitigate the risk of identity theft by someone who might electrically eavesdrop communications between readers and electric tickets. Instead, electric tickets are produced such that the user identity is not derivable from the electric ticket.

There are various techniques to validate the electric tickets. At simplest, the ticket is sent by a chip card to a reader that passes the ticket to an authentication server. The authentication server checks that the ticket is valid, informs the reader of the validity of the ticket, and changes records such that the ticket in question is no longer valid. In some more sophisticated systems, there is a prior step of the reader authenticating itself to the chip card so as to avoid a man-in-the-middle attack in which some other devices imitates the reader and steals the ticket e.g. when in proximity of an NFC chip card. While such a theft would require proximity with the NFC chip card, rush hours in metro trains provides plenty of opportunities for close contacts with others' NFC chip cards.

In some NFC chip card identity based ticketing systems, the chip card authenticates itself to the reader by communications over NFC interfaces, using standardized cryptographic techniques such as public key infrastructure (PKI), challenges, responses, common time references and one-directional hashing.

SUMMARY

Various aspects of examples of the invention are set out in the claims.

According to a first example aspect of the present invention, there is provided an apparatus defined in claim 1.

According to a second example aspect of the present invention, there is provided an apparatus defined in any one of claims 2-10.

According to a third example aspect of the present invention, there is provided an apparatus defined in claim 11.

According to a fourth example aspect of the present invention, there is provided a method defined in claim 13.

According to a fifth example aspect of the present invention, there is provided an apparatus defined in claim 12.

According to a sixth example aspect of the present invention, there is provided an apparatus comprising means for carrying out the method of claim 13.

According to a seventh example aspect of the present invention, there is provided a computer program comprising instructions to carry out the method of claim 13.

According to a seventh example aspect of the present invention, there is provided an apparatus comprising means for implementing a computer program to carry out the method of claim 13.

According to an eighth example aspect of the present invention, there is provided a system comprising at least one apparatus of the first, second and third example aspects and/or a computer program of the seventh or eighth example aspect of the present invention.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the attached drawings.

Figure 1:
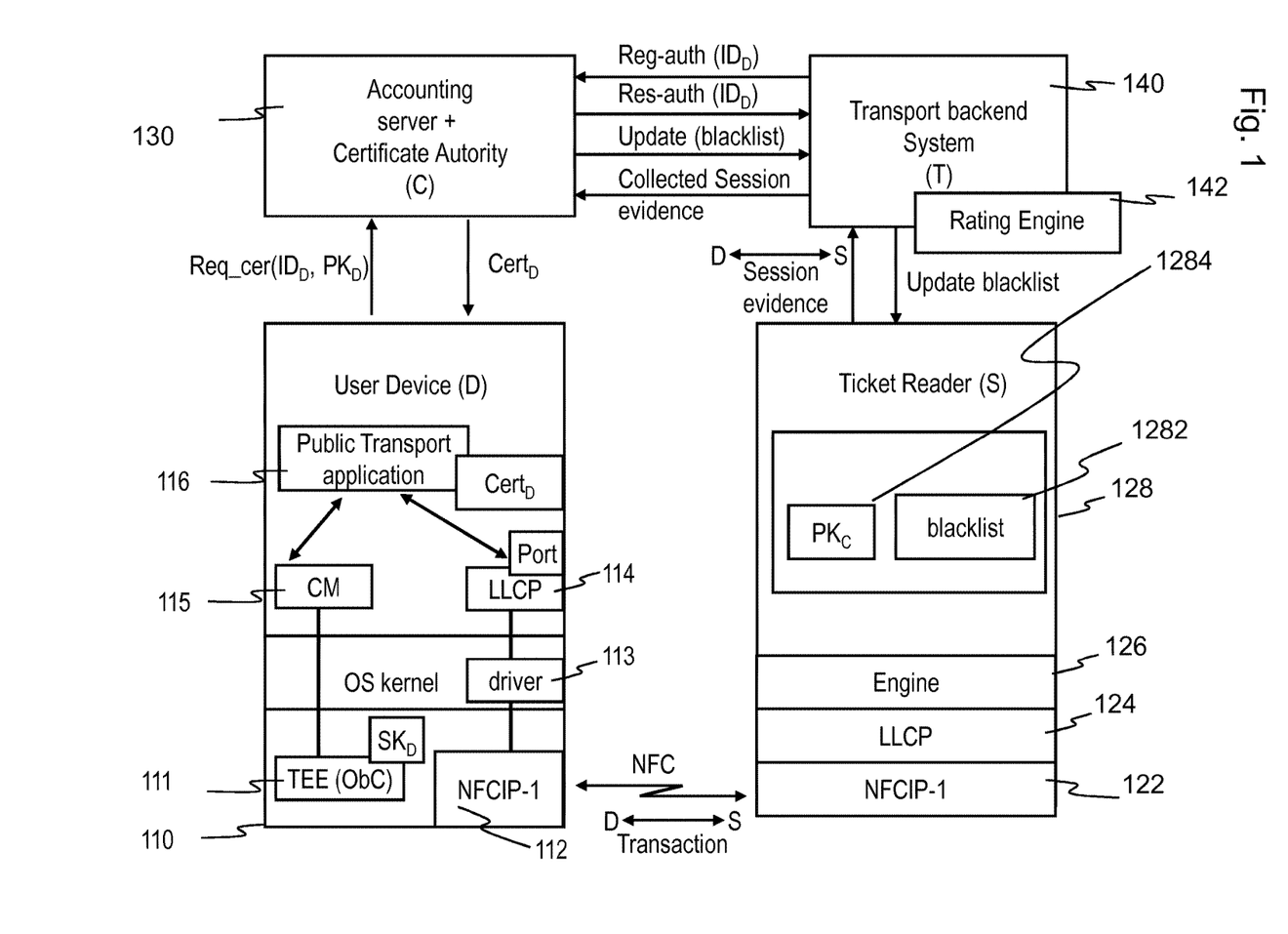
FIG. 1 shows an architectural overview of a system of an example embodiment of the invention.

FIG. 1 shows an architectural overview of a system 100 suited for performing some example embodiments. The system 100 comprises a user device (referred to as D) 110 such as a smart phone and a reader (referred to as S) 120. The D 110 has at least intermittently access to an authentication server (referred to as C) 130, such as a server cluster or cloud. The S 120 has at least intermittently access to a backend system (referred to as T) 140.

The user device or the D 110 is, for instance, a portable device such as a mobile phone, a portable gaming device, a chip card ticket, a navigator, a personal digital assistant, a tablet computer or a portable web browser. The D generally has capabilities for processing information (to perform cryptographic operations) and for communicating with other entities (with the C 130 and with the S 120) at least intermittently when in contactless or contacting access with other entities or with a related communication element.

The D 110 has a cryptographic processing circuitry such as an isolated Trusted Execution Environment (TEE) 111 for cryptographic operations, a communication interface 112 such as a near field communication (NFC), near field communication (NFC) interface driver 113, a Logical Link Control Protocol (LLCP) stack 114, a credential manager CM 115 (that is an interface by which operating system and/or applications can interact with the logic running inside the TEE), and a public transport application 116. In some embodiments, the TEE 111 is isolated as a logically separate function using common hardware circuitries. In other embodiments some or all logical elements of the TEE are implemented with dedicated hardware elements.

The D 110 further comprises, in some embodiments, a user interface, a mobile communication circuitry, an application platform for enabling user installation of applications, and/or a battery for powering the apparatus. In some embodiments, the D 110 is externally powered when used, e.g. with electromagnetic induction or with galvanic contacts.

The S 120 comprises a communication interface such as a near field communication interface 122, a Logical Link Control Protocol (LLCP) stack 124, an engine 126 that is a processing circuitry for controlling various authentication operations, and a memory 128 that comprises various data needed by the S 120 for its operations, including e.g. the public authentication key PKC 1284 of the C 130 and a blacklist 1282 of user devices that have certificates granted by the C 130 that are not yet expired but that should no more be used for granting access to service by the ticket readers i.e. by the S 120.

The S 120 is in some embodiments a fixedly installed device at a gate of a public transport system. In some other embodiments, the S is built into a portable device e.g. for use by ticket inspecting personnel.

The transport backend system T 140 is, in some embodiments, a server that is operated by a service provider and that has communication capabilities for exchanging information with the C 130 and with the S 120. The T 140 of FIG. 1 further comprises a rating engine 142 that is configured to define charging rates for the use of the services of the service provider.

In an example embodiment, the near field communications interface 112 interfaces as provided by currently available hardware and various messages are size optimized. Data transaction between the D 110 and the S 120 (e.g. at transport station gates) is performed using Logical Link Control Protocol (LLCP) over NFC peer-to-peer communication mode. This embodiment enables using link layer transport service classes, such as connectionless data transmission and connection-oriented data transmission, rather than limiting us to the existing NFC card emulation mode, its predefined data and message structures.

Figure 2:
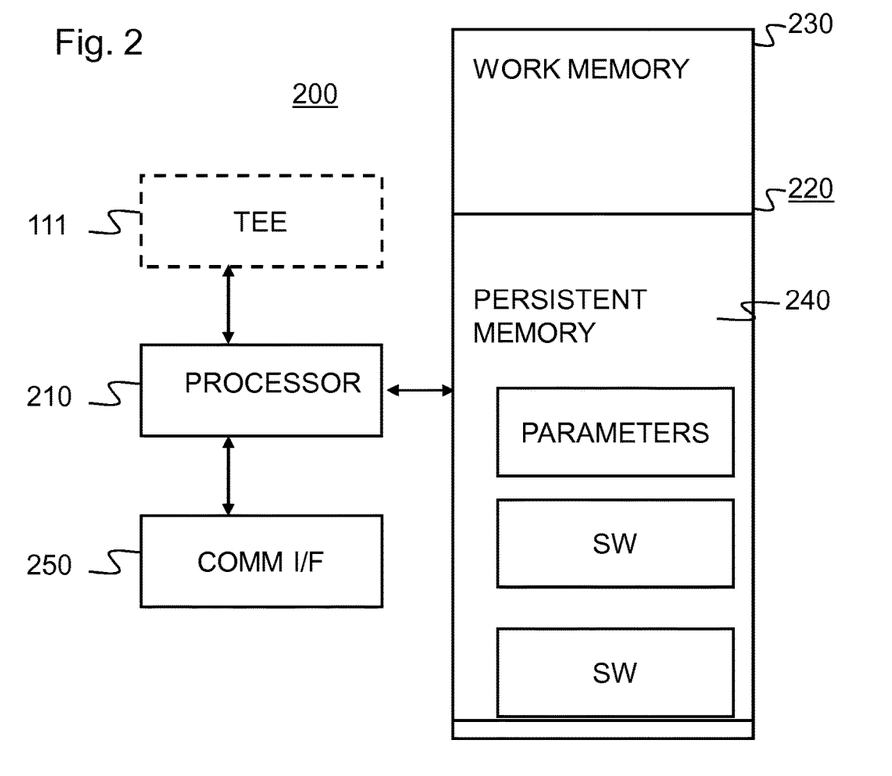
FIG. 2 shows a block diagram of an apparatus suited for operation as different entities according to some example embodiments.

FIG. 2 shows a block diagram of an apparatus 200 suited for operation as different entities according to some example embodiments. The apparatus 200 comprises a communication interface module 250, optionally the TEE 111 (if the apparatus is operating as the D 110), a processor 210 coupled to the communication interface module 250, and a memory 220 coupled to the processor 210. The apparatus further comprises software 230 stored in the memory 220 and operable to be loaded into and executed in the processor 210. In an example embodiment, the software 230 comprises one or more software modules. The software 230 can be in the form of a computer program product that is software stored in a (non-transitory) computer readable memory medium.

The communication interface module 250 is configured to exchange information over one or more local links and/or over one or more other data links such as telecommunication or data network links. The local links are implemented in some example embodiments as wired and/or wireless links. In one embodiment, the communication interface module 250 further implements telecommunication links suited for establishing links with other users or for data transfer (e.g. using the Internet). Such telecommunication links are, for instance, links using any of: wireless local area network links, Bluetooth, ultra-wideband, cellular or satellite communication links. In one embodiment, the communication interface module 250 is integrated into the apparatus 200 or into an adapter, card or the like (that in one embodiment is inserted into a suitable slot or port of the apparatus 200). While FIG. 2 shows one communication interface module 250, the apparatus 200 comprises in one embodiment a plurality of communication interface modules 250.

The processor 210 is, e.g., a central processing unit (CPU), a microprocessor, a digital signal processor (DSP), a graphics processing unit, an application specific integrated circuit (ASIC), a field programmable gate array, a micro apparatus 200 or a combination of such elements. FIG. 2 shows one processor 210. In some embodiments, the apparatus 200 comprises a plurality of processors.

The memory 220 is, for example, a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 200 comprise one or more memories. The memory 220 is constructed as a part of the apparatus 200 in one embodiment. In another embodiment, the memory 220 is inserted into a slot, or connected via a port, or the like of the apparatus 200. In one embodiment, the memory 220 serves the sole purpose of storing data. In an alternative embodiment, the memory 220 is constructed as a part of an apparatus serving other purposes, such as processing data.

The TEE 111 comprises, in one embodiment, similar components as depicted in FIG. 2 with reference signs 210 to 240, i.e. a processor and different memories and software. Further, the TEE comprises an internal communication interface for exchanging information between other parts of the apparatus 200 (e.g. with the processor 210 and optionally also or alternatively with the memory 220 of the apparatus 200).

Some envisioned operations of the system 100 of FIG. 1 are next described on a high conceptual level. In this description, it is assumed that the C 130 and the T 140 can be managed by independent parties such as identity based ticket provider and service provider (e.g. transport operator) who renders actual services that are consumed by users in the system 100. The D 110 has an a-priori relationship with the C 130. As a part of this relationship, the D 130 can uniquely authenticate the D 110 and even messages originating from or destined to the TEE 111. For the purpose of identity based ticketing, the TEE 111 of the device generates a new Rivest, Shamir and Adleman (RSA) key pair, the private part of which never leaves the TEE 111. The public component is sent to the C 130, where it is certified for use in the ticketing context. The certificate also contains a "customer ID" for use in the by a service provider such as transport authority. A certificate is then returned by the C 130 to the D 110. The transport operator's gates are equipped with necessary algorithms along with the public component of the server key which is required to validate the aforementioned certificate. Now, when the C 130 is "tapped" or brought into proximity of the S 120 at the transport operator's entry gate, the necessary data transaction between the D 110 and the S 120 occurs along with the transmission of the identity certificate.

In some embodiments, after receiving necessary information, the S 120 not only validates the certificate as being signed by the correct authority but also validates the identity of the user against a blacklist. The S 120 may also validate other data depending on the protocol used before allowing any access to enter. The transaction evidence, i.e. the certificates, identity and other necessary information is collected along with other context related to the transport. The transactions will, in some embodiments, be further fed to the rating engine 142 and finally provided to the C 130.

Blacklisting of identities is used in some embodiments for blocking the use of the D 110 e.g. that the certificate of the D110 has not yet expired, but the respective account or service usage right has exhausted.

Accounting and Certificate Authority (C)

The C 130 represents an authority that issues identity certificates to user devices (D 110) and also maintains billing information. In addition to this, the C 130 is also the entity responsible for clearing the transaction and maintaining a blacklist for devices or users that do not full-fill their monetary obligations. In other to generate device certificates, the C 130 requires a signing facility with a service private key (SKC) and the C 130 must provide a corresponding public key (PKC) to its relying parties for verification. In some embodiments, the C 130 is a server computer or a cluster of server computers. The C 130 comprises a communication interface configured to exchange information with various other entities such as the D 110, the S 120 and/or the T 140.

User Device (D 110)

The D 110 is, for instance, an NFC integrated Smartphone that will be cryptographically associated with a given account holder in the C 130. The D 110 contains a secure, isolated trusted execution environment (TEE) for processing confidential data. In identity based ticketing the TEE 111 is, in some embodiments, a hardware-rooted functionality for producing signatures with a key generated in the very same TEE 111. Each D 110 representing a user will be associated with a customer or transport identity (IDD), assigned by the C 130. The format of the IDD is in agreement with or accepted by the service provider (e.g. transport authority). For the purpose of the identity based protocol, the TEE 111 also generates and holds a unique pair of PKI keys: a device private key (SKD) and device public key (PKD). For the public key, the C 130 provisions to the TEE 111 user identity certificates (CertD) on a regular basis. The certificate holds information such as PKD, IDD and expiry time (Texp).

Ticket Readers (S)

The S 120 is the representation of readers attached to the transport stations' entry and exit gates. To authenticate responses from the D 110, each ticket reader S 120 needs access to PKC that is the public key of the accounting authority C 130. The readers S 120 also contain an interface for continually updating their copies of the blacklist that is used for validation of user identities. Reader S 120 gathers all the information collected from every data transaction session between the D 110 and the S 120. This gathered information is sent to the transport system's backend server T 140 immediately after the completion of a data transaction session between the D 110 and the S 120. These data are later used as an evidence of transport service usages by the corresponding user IDD. For the purpose of one embodiment of this identity based ticketing, the reader S 120 need not authenticate to the D 110, and thus the S 120 needs no unique identity. In some other embodiments, each reader posses an identity (that is e.g. unique or shared such as a station-wide identity). Additionally, the identity of the S 120 is associated with appropriate keys for authentication.

Backend Server (T)

The T 140 is the representation of backend processing system of the transport authority. This system is responsible for providing the transport services; in the context of the ticketing scheme it operates the readers and gates as well as possible ticket verification while the user is in the transport system. One specific task of the T infrastructure is to provide the charging rating for the transport (e.g. charging rate on different time of day and weekdays), as well as querying (authorizing) the D 110 from the C 130 as the D 110 first appears into the system 100. The T 140 also collects the session information received from the D 110 and presents the session information to the C 130 as evidence of the transport service usage by the corresponding user (with identity IDD). The data transaction between the backend server T 140 and the C 130 may not be synchronous with the data transaction between D and S. However, the T 140 may request the C 130 for the authentication of the identity IDD of the D 110 immediately after the corresponding D 110 uses the service (transport facility in this example).

In some example embodiments, all or some of the functions of the backend server T 140 and of the C 130 are consolidated into either one of these two servers or to another server (not shown in FIG. 1). The separation of the operations of the C 130 and of the T 140 can be used to provide a ticketing infrastructure that is usable by one or more different service providers that do not want to interoperate in their charging or cannot do so (for instance to comply with competition laws).

In one example aspect of this document there is provided a method for identity based authentication with abbreviated authentication signaling between the D 110 and the S 120. In the following, three main examples are described for further description of various embodiments.

First Main Example—Certificate Exchange Optimization

A device certificate Cert_D is constructed by the C 130 as follows:
a) h=hash (ID_D|expiry_time|PK_D), wherein character "|" stands for concatenation of strings;
b) Concatenate h, ID_D, expiry_time, and as many bits of PK_D as can fit into the block size of PK_S, this section of PK_D being referred to as part1. The remaining section of PK_D is referred to as part2 and thus PK_D can be represented as part1|part2;
c) Format the data string "h|ID_D|expiry_time|part1" as required by message encoding scheme for public key signatures with message recovery, such as Public-Key Cryptography Standards (PKCS), published by RSA Laboratories (e.g. PKCS #1, v1.5). Apply the RSA private key transformation to this data string using private key SK_C. The result is denoted as sig1;
d) Apply an encryption scheme applied by the D 110 and the S 120 (e.g., Advanced Encryption Standard (AES) in counter mode) to part2 using h or its derivative being used as the encryption key. The result of the encryption is referred to as sig2;
e) Cert_D=sig1|sig2

The D 110 also receives a challenge from the S 120 and provides a signed response to the S 120. The signed response is, in some embodiments, computed on a previous challenge, in which case the S 120 or the T 140 will verify that the signed response is validly generated based on the previous challenge and the private key of the D 110. The signed response is based on the challenge (present or previous) and on the identity (IDD) of the D 110.

In the identity verification protocol, PK_D is omitted. The S 120 will verify the certificate by applying the RSA public key transformation to sig1 using PK_S, thereby recovering the data string used in step c) above. The S 120 then uses h to decrypt sig2. Now the S 120 can reconstruct PK_D and hence verify the signature sent by D.

Let us review this first main example from the point of view of the accounting entity, the C 130. The C 130 is to manage the identity of the user. This is done by binding the Id of the D 110 to public-key cryptography. The C 130 generates a certificate for an Id that binds that Id to a public key. The public/private key pair is generated inside the TEE 111, and conceptually the private key never leaves that environment. The TEE that is used initially is e.g. an ARM TrustZone environment that is provided by an application processor of the D 110 (such as an OnBoard Credentials architecture available in Symbian phones that have NFC capabilities).

For minimizing authentication traffic (which has a dominant time impact on protocols at 106 kbps commonly used in prevailing NFC implementations), the identity certificates generated by the C 130 are minimized for size. In the following detailed description we assume that we use the RSA algorithm with 1024-bit key lengths for all operations, this includes signing key of the C 130. The following data is included in the certificate by the server:

A 6-byte Id field.
A 4-byte certificate expiry field, expressed as UNIX time, i.e. seconds since 1.1.1970.
A public key. Only the modulus of the 1024-bit RSA is included, in a raw format, most significant bit and byte first. All keys have the public exponent 0x10001, this is compatible with both OnBoard Credentials (ObC) and Trusted Computing Group/Trusted Platform Module (TCG/TPM) and Trusted Computing Group/Mobile Trusted Module (TCG/MTM) technology.

The identity certificate of the D 110 will contain a Secure Hash Algorithm (SHA) 2 (256 bit) hash shrunk (e.g. truncated, punctured or compressed) to 128 bits over the items listed above in the order given above. Thus the hash algorithm produces 16 bytes of output for an input of 138 bytes. These two byte strings are combined (e.g. concatenated), hash first, into a byte string of 154 bytes. Of the 154 bytes, 117 bytes are input to the RSA private key exponentiation with PKCS #1 1.5. The RSA exponentiation will include the hash function result. The 37 bytes (of the public key) that do not fit in the exponentiation will be encrypted with AES-CTR mode using an initialization vector (IV) of 0 and the hash result as the key. These encrypted 37 bytes are combined (e.g. appended) to the result of the exponentiation. Thus the overall certificate length is 128+37=165 bytes. The certificate can be validated and used by anybody with access to the public key of the accounting server.

The first main example as described in the foregoing has e.g. such a technical effect that the response sent by the D 110 during identity verification is abbreviated as the public key PK_D need not be transmitted separately and thus the public key PK_D is not recoverable from outside of the certificate.

Figure 3:
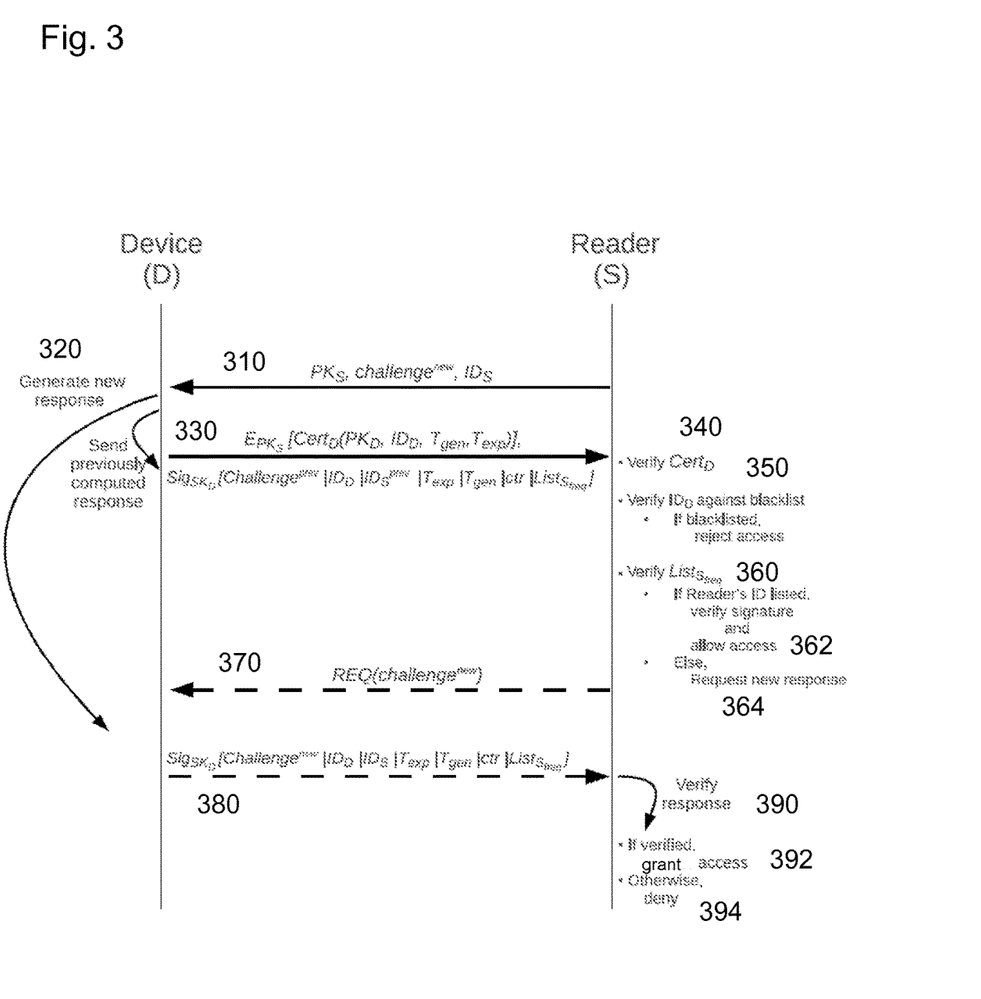
FIG. 3 illustrates some operations according to one example embodiment e.g. in connection with a first main example.

FIG. 3 illustrates some operations according to one example embodiment that makes use of some of the techniques described in connection with the first main example. The S 120 sends its challenge encrypted with its private key to the D 110. The D 110 starts generating 320 of a new response when it has free processing time (i.e. after the now starting authentication session). Responsively to the challenge, the D 110 sends a previously computed response 330 to the S 120, that response being encrypted with the public key PKS of the S 120 over the certificate and further comprising a signed response based on a previously received challenge. The S 120 receives the previously computed response 330 (or in some other embodiments a response based on the present challenge) and verifies 340 the certificate. In some embodiments, the S 120 also verifies 350 the IDD against its blacklist and if on the blacklist, rejects the access. The S 120 also verifies 360, in this embodiment, the list of previous reader identities that was contained in the previously computed response 330 to see if its own identity was included on that list and if yes, allows access 362 or otherwise requests 364 a new response by sending a new challenge. If the new challenge 370 is sent, the D computes and sends back a new response 380 based on the new challenge. The S 120 then verifies 390 the new response 380 and if the new response passes this verification, the S 120 grants access 392, otherwise the S 120 denies 394 the access.

Second Main Example—Transaction Record

In this example, the identity verification between the D 110 and the S 120 omits sending of both PK_D and the signature of the D 110 to the S 120. Instead, the signature is sent, at some point of time, directly from the D 110 to the C 130 for later auditing and verification by the C 130. Since this signature need not be verifiable by the S 120, it can be made even smaller by constructing it as a message authentication code (MAC) by using a symmetric key shared between the D 110 and the C 130.

The response sent during identity verification need not contain either of the signature and public key of the D 110. Moreover, standard cryptographic protocols can be used. On the other hand, only item that is cryptographically verified by the S 120 is the Cert_D, and thus an attacker could replay Cert_D and gain admission to the system. This risk can be mitigated with the following example embodiments:

a) Include data in the Cert_D thus limiting the scope of its applicability (e.g., identity of the checkpoint—in the public transportation case, the identity of the particular station that the user typically uses).
b) Limit the lifetime of Cert_;
c) Limit the number of authentications that the TEE 111 is allowed to perform after last data exchange session with the C 130.

An example of this second main example is next presented.

The D 110 receives an ephemeral certificate as access token from the C 130. The token remains valid e.g. at most a day. Therefore, the D 110 is configured to contact C 130 every day (provided that the D 110 is able to make connection to the C 130). This access token holds similar information as long-life certificates. In addition, the accesstoken holds, in this example embodiment, information such as time of generation of the access token (referred to as Tgen) and/or a counter (ctr).

The S 120 only stores a public key PKC of the certificate authority C 130 for verifying the access tokens. Similarly, we assume that all the readers at one transport station (or other station for providing services) share a station wise identity IDD.

An example of a message transaction sequence, when the D 110 and the S 120 engage into an authentication session, is such that:

1. A user wants to enter a gate at a station and she places her D 110 near the S 120 (e.g. attached to the station gate).
2. the S 120 establishes a near field communication with the D 110 and initiates the session by sending a random challenge, a new challenge denoted as challengenew along with its identity (IDS) and other context related data.
3. At this point, the D 110 should have a pre-computed message authentication code (MAC) based on the previous challenge, a challenge challengeprev, that is received from an immediate previous authentication session with a reader device S 120. A dummy initial challenge is used to generate a message authentication code (MAC) if the device is used for the first time. The MAC also includes information such as identity of the device IDD, time of generation Tgen, identity of the challenger IDSprev (a dummy ID in case of first time uses), and/or a counter ctr. The D 110 sends this pre-computed MAC along with a short-life access token to the S 120. It should be noted that the D 110 only shares the secret key of such a MAC with the C 130 as the S 120 is not expected to verify the MAC.

4. In the mean time, the D computes a new MAC over the recently received challenge, challengenew, in the background.

5. On receiving the access token and the MAC, the S 120 verifies the access token and verifies the IDD against its blacklist. If the IDD is blacklisted, the S 120 simply denies service access and terminates the session. In some other embodiments, the S 120 records the attempt to use the access token and/or signals the attempt to a local or remote station.

6. After verifying the IDD, the S 120 allows access to the D 110, collects information, combines the information with auxiliary context information as evidence for the rating procedure and protection against repudiation at a later time. This information is then sent in an online or off-line communication to the back-end server T 140.

This protocol variant only verifies the short-life access token. Here the accounting server C 130 is responsible for verifying the MAC collected from every D←→S session. This protocol variant can run fast as real-time cryptographic operations may be disposed with. Moreover, the reducing of the life time of access tokens can be made utilized to inhibit growing of the black lists as the expiry of the access tokens naturally removes identities from the black lists.

Figure 4:
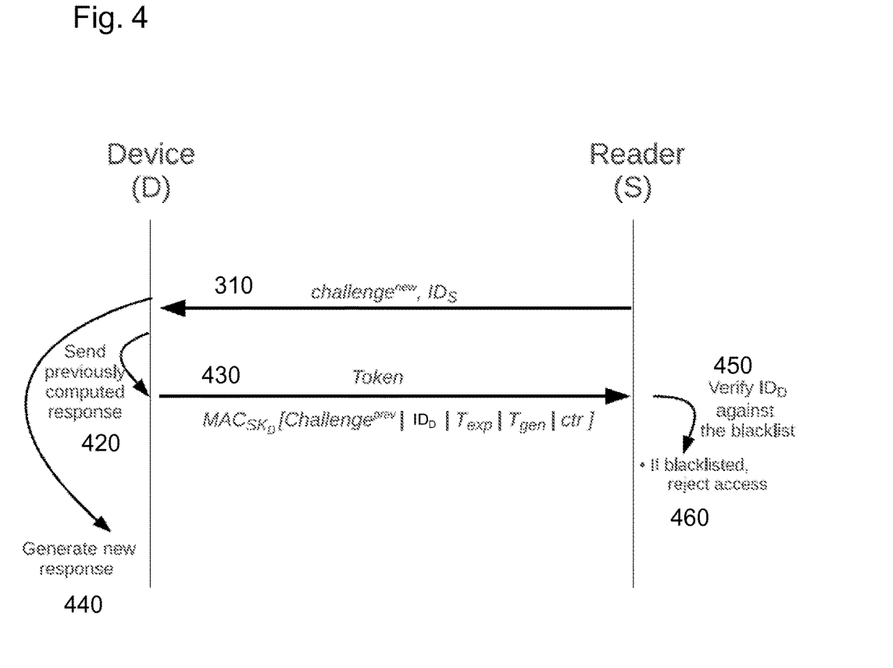
FIG. 4 illustrates some operations according to another example embodiment e.g. in connection with a second main example.

FIG. 4 illustrates some operations according to another example embodiment e.g. in connection with a second main example. As in FIG. 3, the S 120 sends the challenge 310. Responsive to receiving of the challenge 310, the D 110 sends 420 a previously computed response to the S 120. The previously computed response comprises, in this embodiment, an access token or message authenticator 430 that is formed by encrypting with the private key of the D 110 a (previous) challenge, the identity of the S 120 received with the (previous) challenge, and various other data items such as the expiry time, time of generation (of the certificate) and a counter. The D 110 also starts generation 440 of a new response for use as a next authenticator. On receiving the access token 430, the S 120 verifies 450 the identity of the D 110 (IDD) against its blacklist and if the IDD is on the blacklist, the S 120 rejects 460 access of the D 110 to the service.

Third Main Example—Transaction Record and Hash

This third main example resembles the second main example in that there is no transmission of the public key or of the certificate of the D 110. Additionally, here a hash chain is used to mitigate the risk of reusing certificates of the D 110. A hash chain of length n is constructed by the D 110 by choosing a random secret seed $c\_n$ and repeatedly applying a cryptographic hash function h( ) n times to result in "top" value $c\_0$: i.e., $c\_0 = h (h \ldots n \text{ times} \ldots h (c\_n))$ Identity Provisioning:
D→C: $c\_0$, n (subject to some form of user authentication)
C→D: Cert_D=Sig_C (ID_D|expiry_time|$c\_0$|n)

Identity Verification:
S→D: challenge, ID_S
D→S: $c\_i$, i, Cert_D

Here, the S 120 verifies the identity of the D 110 by applying h( ) to $c\_i$ the specified number of times (i times) and checking if the result matches the top value included in the Cert_D. As in the second main example, the D 110 is configured to send a transaction record signature to the C 130 after every transaction, either immediately or at a later time. The D 110 or the TEE 111 is in some embodiments configured to abstain from further authentication sessions with the S 120 after a given number of transaction record signatures remain unsent to the C 130.

There are several ways in which re-use of $c\_i$ by an attacker can be prevented or mitigated.

a) Limit the duration of validity of $c\_i$; this requires loosely synchronized clocks between the D 110 and the S 120. The validity duration can be made rather small (e.g., 5 minutes).

b) The S 120 reports the latest i value for a Cert_D to a centralized backend after every accepted identity verification. Before accepting identity verification for a given Cert_D, the S 120 checks that the claimed i value has not already been used.

This third main example has e.g. such a technical effect that the response sent by the D 110 during the identity verification can be as short as in the second main example, but the threat of replay attack can be further curbed without shortening the life time of the certificates i.e. without increasing the frequency of identity provisioning transactions.

Figure 5:
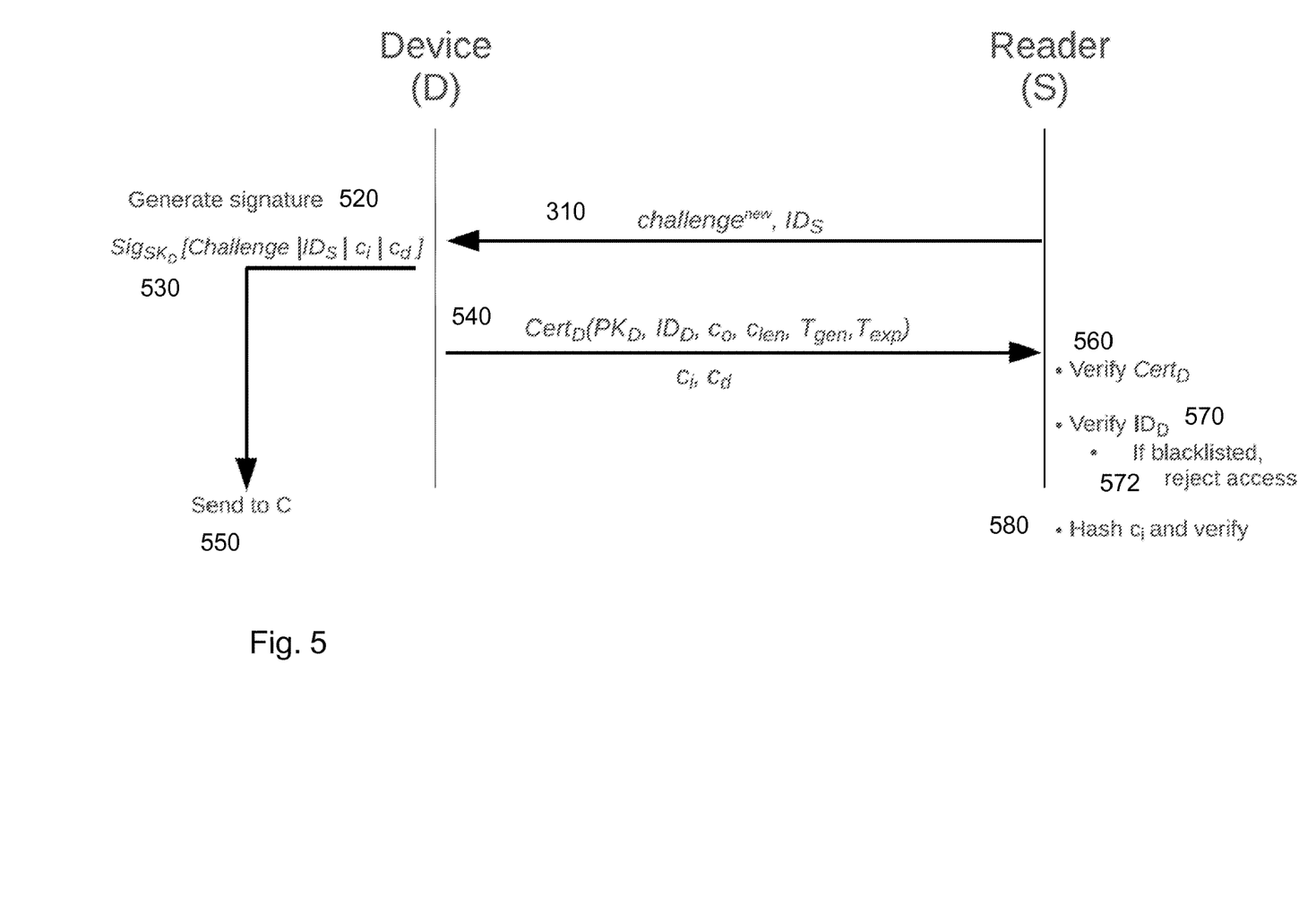
FIG. 5 illustrates some operations according to yet another example embodiment e.g. in connection with a third main example.

FIG. 5 illustrates some operations according to yet another example embodiment e.g. in connection with a third main example. As in FIGS. 3 and 4, the S 120 first sends the new challenge and its identity IDS. The D 110 generates 520 a signature 530 by signing with its private key the new challenge, identity of the S 120, the random secret seed $c\_0$, hash chain length clen, the time of generation Tgen and the expiry time Texp. The D 110 sends 550 the signature to the C 130 either immediately or at a later time. The D 110 also sends 540 to the S 120 the signature and the i times hashed seed number (ci) and the distance in the hash chain (cd) of the i times hashed seed number. The S 120 then verifies 560 the certificate, verifies 570 the identity of the D 110 (IDD) by comparing of the blacklist of the S 120, and if the IDD is in the blacklist, the S 120 rejects 572 the access, or if not, checks the hash chain 580 to verify whether access to the service should be granted.

In the foregoing, various details have been described with reference to different credentials used to authenticate a user who desires to access some service. It shall be appreciated that the user may have one or more user devices (D 110) and in some embodiments, various user credentials are associated more particularly with the user that with the user device D 110. However, the exchange of messages e.g. with NFC is performed between devices, that is, the D 110 sends and receives messages rather than the user herself, but it should be understood that any credentials associated with the D 110 may be understood as being associated with the user who uses the D 110 and as possibly being shared by a number of different devices that are owned or controlled by the user.

Various example embodiments described herein are described to illustrate various possibilities within the scope of the claims to address the following objectives:

Accountability and security: it should be sufficiently secure so that the service operator (such as the public transport operator) and identity provider can manage their risks effectively.

Speed: typically the interaction events have a strict time-budget within which a typical transaction should be completed. For public transport systems, an example bound is 300 ms.

Privacy: it should not allow third parties to track the movements of a user.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
a communication interface;
memory configured to store user specific credentials; and
a cryptographic processing circuitry; wherein the cryptographic processing circuitry is configured to:
  receive a certificate via the communication interface from a certificate authority;
  cause storing of the certificate in the memory;
  cause storing of a private key and a public key in the memory; and
  cause attempting of authenticating of the apparatus to a ticket reader for accessing a service, by transmission of one or more messages, wherein each of the one or more messages contains a transaction record signature, an authenticator that comprises an i times hashed seed number in which i represents a number of times that a hash function was applied to a random secret seed having a predetermined validity duration, and a distance in a hash chain of the i times hashed seed number, the distance indicative of the number of times the certificate has been used to attempt authenticating of the apparatus, the hash chain constructed by choosing the random secret seed and repeatedly applying the cryptographic hash function i times, in order to limit a number of times the certificate can be used for the authenticating of the apparatus.

2. The apparatus of claim 1, further comprising a general processor configured to control basic operations of the apparatus and wherein the cryptographic processing circuitry is further configured to function as a trusted execution environment that is operationally separated from the general processor.

3. The apparatus of claim 2, wherein the apparatus further comprises a user interface that is controlled by the general processor.

4. The apparatus of claim 1, wherein the cryptographic processing circuitry is further configured to receive a challenge from the ticket reader and to responsively compute a signed response.

5. The apparatus of claim 4, wherein the cryptographic processing circuitry is further configured to cause, responsive to receiving of the challenge, sending a previously computed signed response that was computed based on a previously received challenge.

6. The apparatus of claim 1, wherein the certificate has been generated in a process comprising computing a cryptographic hash from source data comprising at least: an indication of the identity of the user; an expiry field; and the public key.

7. The apparatus of claim 6, the process further comprising shrinking of the cryptographic hash.

8. The apparatus of claim 1, wherein:
the cryptographic processing circuitry is further configured to generate the authenticator using: a public key of the certificate authority and the private key of the apparatus.

9. The apparatus of claim 8, wherein:
the cryptographic processing circuitry is further configured to use, for generation of the authenticator, at least one of the following: the identity of the apparatus; the time when the certificate authority has generated the certificate for the apparatus; and a challenge that has been previously received from a ticket reader.

10. The apparatus of claim 1, wherein the authenticator is a message authentication code generated by the cryptographic processing circuitry.

11. An apparatus, comprising:
memory configured to store a public key of a certificate authority;
a communication interface configured to exchange messages with a user device; and
a processor configured to:
  cause an authenticating session with the user device for authenticating using of a service by the user device; and
  receive from the user device one or more messages using the communication interface, wherein each of the one or more messages contains a transaction record signature, an authenticator that comprises an i times hashed seed number in which i represents a number of times that a hash function was applied to a random secret seed having a predetermined validity duration, and a distance in a hash chain of the i times hashed seed number, the distance indicative of the number of times the certificate has been used to attempt authenticating of the apparatus, the hash chain constructed by choosing the random secret seed and repeatedly applying the cryptographic hash function i times, in order to limit a number of times the certificate can be used for the authenticating of the apparatus.

12. The apparatus of claim 11, wherein the processor is further configured to:
maintain in the memory a blacklist of user identities;
compare a user identity with the blacklist; and
reject access of the user device to the service if the user identity belongs to the blacklist.

13. A method in an apparatus, comprising:
storing user specific credentials;
receiving a certificate from a certificate authority;
storing the certificate;
storing a private key and a public key in the memory; and
attempting authenticating of the apparatus to a ticket reader for accessing a service, by transmission of one or more messages, wherein each of the one or more messages contain a transaction record signature, an authenticator that comprises an i times hashed seed number in which i represents a number of times that a hash function was applied to a random secret seed having a predetermined validity duration, and a distance in a hash chain of the i times hashed seed number, the distance indicative of the number of times the certificate has been used to attempt authenticating of the apparatus, the hash chain constructed by choosing the random secret seed and repeatedly applying the cryptographic hash function i times, in order to limit a number of times the certificate can be used for the authenticating of the apparatus.

* * * * *